United States Patent
Dubey et al.

(10) Patent No.: US 11,262,715 B2
(45) Date of Patent: Mar. 1, 2022

(54) CLOSED LOOP NODAL ANALYSIS

(71) Applicant: Accenture Global Solutions Limited, Dublin (IE)

(72) Inventors: Manisha Dubey, New Delhi (IN); Rajneesh Soni, Delhi (IN); Babu Xavier Raj, Pondicherry (IN); Swaminathan Anuradha, Chennai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1039 days.

(21) Appl. No.: 15/907,536

(22) Filed: Feb. 28, 2018

(65) Prior Publication Data

US 2018/0284709 A1    Oct. 4, 2018

(30) Foreign Application Priority Data

Mar. 30, 2017 (IN) .............................. 201741011333

(51) Int. Cl.
*G06N 20/00* (2019.01)
*G06Q 10/06* (2012.01)
*G05B 19/042* (2006.01)

(52) U.S. Cl.
CPC ........... *G05B 19/042* (2013.01); *G06N 20/00* (2019.01); *G06Q 10/0633* (2013.01)

(58) Field of Classification Search
CPC .... G06F 40/166; G05B 19/042; G06N 20/00; G06Q 10/0633
USPC .................................. 715/200, 255; 706/12
See application file for complete search history.

(56) References Cited

U.S. PATENT DOCUMENTS

| | | | | |
|---|---|---|---|---|
| 7,899,764 B2 * | 3/2011 | Martin | ..................... | G06F 19/00 706/12 |
| 8,332,932 B2 * | 12/2012 | Kellas-Dicks | ........ | G06F 21/316 726/18 |
| 8,543,517 B2 * | 9/2013 | Shotton | .................. | G06N 20/00 706/12 |
| 8,639,596 B2 * | 1/2014 | Chew | ..................... | G06Q 40/00 705/30 |
| 8,682,814 B2 * | 3/2014 | DiCorpo | ................ | G06N 20/00 706/12 |
| 9,058,315 B2 * | 6/2015 | Burr | ...................... | G06F 40/166 |

(Continued)

FOREIGN PATENT DOCUMENTS

| | | | | |
|---|---|---|---|---|
| EP | 3215900 A1 * | 9/2017 | .......... | G06F 3/0484 |
| WO | WO 2017/001560 | 1/2017 | | |

OTHER PUBLICATIONS

Examination Report No. 3 issued on Australian patent application No. 2018200877 dated Apr. 1, 2019, 8 pages.

(Continued)

*Primary Examiner* — Manglesh M Patel
(74) *Attorney, Agent, or Firm* — Crowell & Moring LLP

(57) ABSTRACT

An automation optimization engine is disclosed that provides a closed loop nodal analysis on a process performance tree. By analyzing an observed process and identifying automatable tasks from non-automatable tasks from the observed process, the automation optimization engine then applies machine learning techniques to generate a recommendation report identifying steps for implementing in the observed process to convert the non-automatable tasks into automatable tasks. Optimization is thus achieved to close the loop to further automate the observed process.

20 Claims, 10 Drawing Sheets

(56) References Cited

U.S. PATENT DOCUMENTS

| | | | | |
|---|---|---|---|---|
| 9,471,883 | B2* | 10/2016 | Chatterjee | G06F 16/35 |
| 9,665,713 | B2* | 5/2017 | Avasarala | G06F 21/56 |
| 2011/0099532 | A1* | 4/2011 | Coldicott | G06F 8/36 |
| | | | | 717/105 |
| 2012/0016678 | A1* | 1/2012 | Gruber | G06F 9/54 |
| | | | | 704/275 |
| 2013/0117280 | A1* | 5/2013 | Donaldson | G06F 16/17 |
| | | | | 707/748 |
| 2014/0188577 | A1* | 7/2014 | Gerber | G06Q 10/06398 |
| | | | | 705/7.42 |
| 2016/0232457 | A1 | 8/2016 | Gray et al. | |
| 2016/0350919 | A1* | 12/2016 | Steigauf | G06K 9/6263 |
| 2017/0001308 | A1* | 1/2017 | Bataller | G05B 19/0423 |
| 2021/0110345 | A1* | 4/2021 | Iyer | G06Q 10/0633 |

OTHER PUBLICATIONS

Australian Examination Report No. 1, dated Jun. 24, 2020, pp. 1-6, issued in Australian Patent Application No. 2019203230, Offices of IP Australia, Woden ACT, Australia.

Australian Patent Office, Examination Report No. 1 in Australian Application No. 2018200877 dated May 14, 2018, pp. 1-7.

'How to Create a Winning Workflow Diagram in Comindware Tracker', Oct. 13, 2016 [retrieved from the internet on Jun. 5, 2018]. <URL: https://www.comindware.com/blog-how-to-create-a-winning-workflow-diagram/>.

Konig, R., "Engineering of IT Management Automation along Task Analysis, Loops, Function Allocation, Machine Capabilities", Thesis, Ludwig Maximillian University of Munich, Apr. 12, 2010 [retrieved from the internet on Jun. 5, 2018]. <URL: https://edoc.ub.uni-muenchen.de/12649/1/Koenig_Ralf.pdf>.

Plaisant, C. et al., Spacetree: Supporting Exploration in Large Node Link Tree, Design Evolution and Empirical Evaluation. InfoVis'02. Boston, MA. pp. 57-64, Oct. 2002 [retrieved from the internet on Jun. 5, 2018]. <URL: http://www.cs.umd.edu/hcil/trs/2002-05.html>.

Examination Report No. 2 for Australia application No. 2018200877, dated Oct. 19, 2018, pp. 1-7.

Rafique, H. "Robotic Process Automation—bringing on the new team player—Accenture Insurance Blog" dated May 19, 2016, retrieved from the Internet on Nov. 26, at URL: <https://insuranceblog.accenture.com/robotic-process-automation-bringing-on-the-new-team-player> pp. 1-2.

Talent Augmentation: Through Intelligent Process Automation, Smart Robots Extend the Capabilities and Creativity of Smart Humans, Retrieved from the Internet on Nov. 26, 2018 from URL: <https://web/archive.org/web/*/https://www.cognizant.com/perspectives/talent-augmentation-through-intelligent-process-automation-smart-robots-extend-the-capabilities-and-creativity-of-smart-humans> Published on Feb. 7, 2017 per Wayback Machine, pp. 1-12.

Srivastava, S., ""Robotics" in process operations: Useful rapid automation, no transformation panacea", Genpact. Retrieved from the Internet on Nov. 26, 2018 from URL: <http://www.genpact.com/docs/resource-/-robotics-in-process-operations-useful-rapid-automation-no-transformation-panacea>. Published on Jul. 13, 2014 per Wayback Machine, pp. 1-6.

Myers, K. et al., "Learning by Demonstration Technology for Military Planning and Decision Making: A Deployment Story", In Proc. of the 23rd Conf. on Innovative Applications of Artificial Intelligence (IAAI-11), San Francisco, CA, Aug. 2011. Retrieved from the Internet on Nov. 26, 2018 from URL: <https://www.sri.com/sites/default/files/1835.pdf> and <URL:https://www.aaai.org/ocs/index.php/IAAI/IAAI-11/paper/download/3545/4017> pp. 1-8.

Australian Examination Report No. 1, dated Mar. 27, 2020, pp. 1-4, issued in Australian Patent Application No. 2019203230, Offices of IP Australia, Woden ACT, Australia.

Examination report No. 3 for Australian application 2019203230 dated Jan. 21, 2021, 5 pages.

India Office Action dated Jul. 1, 2020, pp. 1-7, issued in Indian Application No. 201741011333, Intellectual Property India, Chennai, India.

* cited by examiner

Entitlement Study Reports Dashboard

Region: NALA/EMEA/APJ  ○ Country: India ▾  ○ Location: Bangalore ▾  ○ Client: AB ▾  Deal: AB
Capability: Finance and Account ▾  ○ Tower  ○ Process: P2P ▾  ○ 3 Way match ▾  ○ Sub Process: 3 Way match ▾  Wave: Wave 1

702 — Update | Cancel | AOPV Execution — 704
Update DT — 701
Options

Entitlement Phase: Phase1 ▾  ○ Readiness: BE_Approved ▾  Language: English  ○ KEY SLA  sla Business Excellence — 705

| Process Subset | Step # | Process Flow | Avg. Monthly Volume | Volume Unit | ANT | Input/Output | LOGIC BASED | JUDGMENT BASED | Automation Feasible | CORD | | |
|---|---|---|---|---|---|---|---|---|---|---|---|---|
| Receive through email/in | 1 | Receive of request | 45 | Unit | 15.00 | Input | Y | N | Y | Consolidate | 675.0 | |
| Anaylsis | 2 | Anaylsis the invoice | 60 | Unit | 50.00 | Process | Y | N | Y | Consolidate | 3000 | |
| Identify the type of reque | 3 | Identify the type of reque | 100 | Unit | 15.00 | Process | Y | N | Y | Repetitive | 1500 | |
| SME for clarification | 4 | Reach out the SME rega | 75 | Unit | 10.00 | Process | N | Y | N | Objective | 750.0 | |
| Oracle | 5 | Go to supplier maintenance | 55 | Unit | 15.00 | Process | Y | N | Y | Consolidate | 825.0 | |
| Update info | 6 | Update in Oracle as per | 80 | Unit | 35.00 | Output | Y | N | Y | Digital | 2800 | |
| Send for validation | 7 | Send for confirmation to | 75 | Unit | 15.00 | Output | Y | N | Y | Consolidate | 1125 | |
| Update the tracker | 8 | Update the tracker once | 25 | Unit | 45.00 | Output | Y | N | Y | Objective | 1125 | |

FIG. 7

CLOSED LOOP NODAL ANALYSIS

CROSS-REFERENCE TO RELATED APPLICATION(S)

This application claims priority to India Patent Application No. 201741011333, filed Mar. 30, 2017, the entirety of which is hereby incorporated by reference herein.

BACKGROUND

Due to the lack of available technology to improve the efficiency of certain manual tasks or to automate these tasks, many enterprises still rely on manual processes fulfilled by agents to operate. Accordingly, it is desirable to create advancements in computer and networking technology for automating manual processes and identifying areas for improved efficiencies.

DESCRIPTION OF THE FIGURES

FIG. 7 illustrates another exemplary graphical user interface (GUI) generated by the automation optimization engine.

DETAILED DESCRIPTION

Figure 1:
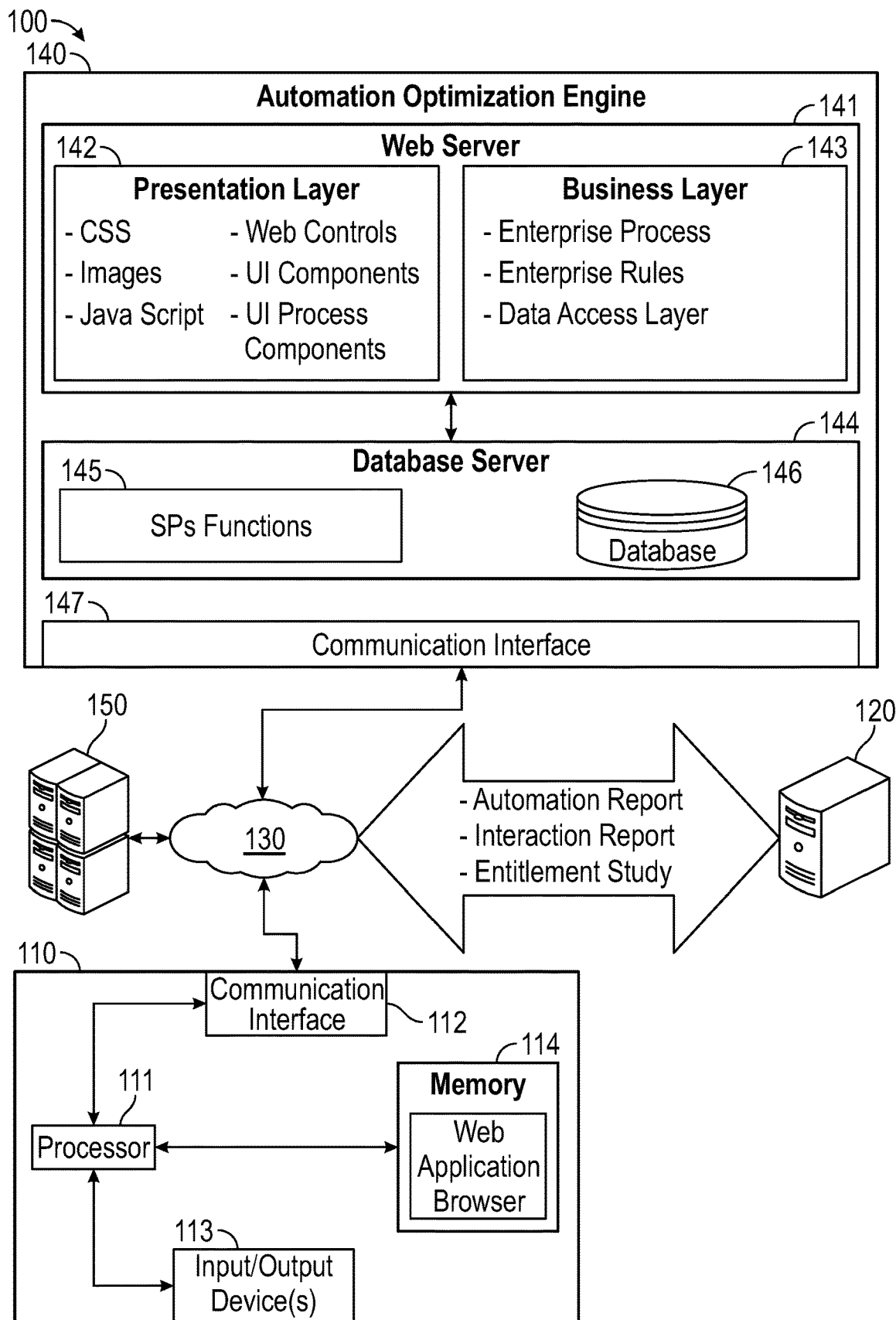
FIG. 1 illustrates an exemplary application platform system for hosting an automation optimization engine.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Automation of processes may not be best considered from the viewpoint of an individual silo. This is because the process may actually be part of a larger process that would not be noticeable without taking a wider scope consideration from a higher viewpoint. Thus, automation is analogous to driving a journey for a process by looking at the end-to-end desired business outcome. An initial analysis of the desired business outcome may result in the identification of processes that are automatable, processes that are potentially automatable, and processes that are not automatable (either by design or other business rule restriction). By looking back from the desired business outcome (e.g., full automation of an observed process), an automation optimization engine (AOE) is able to consider each of these different processes to close the loop by offering specifically tailored recommendations for automating the processes that are identified as not yet being automatable (i.e., potentially automatable). The AOE achieves this desired business outcome by creating a roadmap identifying non-automatable sub-processes within the observed process and providing tailored recommendations describing specific changes that will bring the non-automatable sub-processes to an automatable state. By doing so, the AOE provides continuous improvement to the observed process by aiding in the automation of increasingly more processes and sub-processes. When the recommended changes are then implemented, automation is achieved, which results in greater efficiencies for the enterprise process.

The AOE is a tool that offers a baseline for analyzing enterprise processes to determine ripeness for automating enterprise process. When the AOE determines an enterprise process is ripe for automation, the AOE further provides recommended changes that will bring a non-automatable process to an automatable state. To achieve this goal, the AOE tool first obtains an entitlement study for an enterprise process (i.e., the observed process). The entitlement study may be received from an automation server, or generated by the AOE directly. The entitlement study is an automation study that analyzes the enterprise process at a keystroke level by observing a user's keystroke actions during implementation of the enterprise process. The observations of the user's keystroke actions may include detecting keystrokes entered into a keyboard or pad, as well as tracking the location and clicking actions of a mouse. The user's keystroke actions are observed as the user interacts with an application running on a computer as part of the implementation of the enterprise process.

The keystroke actions may then be analyzed to segment individual sub-processes that comprise the enterprise process. Each segment is then analyzed according to CORD principles of automation to determine individual sub-processes or processes from the enterprise process that have the potential to be automatable: 1) Consolidating user activities, 2) Objective decision making, 3) Repeatable actions, and 4) Digital data.

Consolidating user activities may include predetermined keystroke actions that consolidate one or more user activities within an application such as copy and paste digital alphanumeric information, or drag and drop cells of digital alphanumeric information. Such consolidating keystroke activities are considered automatable under the CORD principles. Objective decision making may include predetermined rule based actions where structured actions related to digital data that satisfy the predetermined rules are considered automatable for relating to an objective decision making rule. Repeatable actions may include a set of predetermined keystroke actions that are defined as being repeatable, and thus also automatable. Digital data may include digital information used during the enterprise process that is easily readable and extractable. Such digital data is considered automatable under the CORD principles.

Processes or sub-processes that are determined to satisfy one or more of the CORD principles will be tagged as being automatable. Processes or sub-processes that are determined not to satisfy the CORD principles will be tagged as being non-automatable. The entitlement study is generated to include a list of automatable processes or sub-processes from the enterprise process, a list of non-automatable processes or sub-processes from the enterprise process, and corresponding keystroke information gathered during the enterprise process that provides a time and motion study for the keystroke actions during the enterprise process.

The AOE receives the entitlement study as an input and is able to output tailored recommendations for changes to the non-automatable processes or sub-processes that will place the non-automatable processes or sub-processes in condition for automation.

FIG. 1 illustrates exemplary system architecture for an application platform system 100 that includes component devices for implementing features of the described AOE 140. The application platform system 100 includes a communication device 110, an automation server 120, a machine learning server 150, and the AOE 140. The AOE 140 is comprised of the hardware, software, and/or circuitry for operating a web-based application representative of the features attributed to the AOE 140. The web-based application may be referred to as an art of possible application. The art of possible application may be accessed, for example, by a web application browser running on the communication device 110 that accesses the web-based art of possible application running on a web server 141, through a network 130.

To support the web-based application, the AOE 140 is shown to include the web server 141 and a database server 144. The web server 141 includes both a presentation layer 142 and a business layer 143. The presentation layer 142 includes the hardware, software, and/or circuitry for presenting and receiving information from a user. For example, the presentation layer 142 may include Cascading Style Sheets (CSS) coding, images, java script coding, web controls, user interface (UI) components, and UI process components for running the art of possible application that is representative of the AOE 140. The web server 141 may be configured according to an ASP.net web application framework to support the web-based application representation of the AOE 140.

The business layer 143 includes the enterprise processes that are analyzed by the AOE 140 for automation optimization, enterprise rules that are applied for determining the tailored recommendations, and a data access layer for accessing data during a process run by the AOE 140. The enterprise rules that may be used and recovered include: 1. The effort size of the process in terms of AHT (Average Handling Time) and Volume (in terms of Process volume); 2. Capability and type of work being processed and action taken for similar process in automation assessment; and 3. Does the input and system match with the AOE steps taken and can it be extrapolated to this scenario. The business layer 143 may be configured according to a .NET software framework to support the web-based application representation of the AOE 140.

The AOE 140 further includes a database server 144. The database server 144 includes Sub Process and functions 145 and a database 146. The Sub process is derived from AOP configuration screens and helps in classification and improving data storage and recovery. The Functions are capabilities to which Sub Process refers to in action and processing.

The database 146 may be accessed by the data access layer included in the business layer 143, where the database 146 stores historical data describing prior iterations of recommendation reports generated by the AOE 140 for specific enterprise processes. The historical data may be categorized in the database 146 according to the applicable industries the enterprise process is being implemented for (e.g., oil industry, accounting industry, human resources industry), and/or a type of process the enterprise process belongs to (e.g., new employee intake process, paid time off management process, payroll process).

The AOE 140 also includes a communication interface 147 for communicating with other component computing devices in the application platform system 100 through the network 130. One such component computing device is the communication device 110 that may include well known computing systems, environments, and/or configurations that may be suitable for accessing the AOE 140 such as, but are not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like. FIG. 1 shows that the communication device 110 includes a processor 111, a memory 114 configured to store the instructions for operating a web application browser, an input/output device 113, and a communication interface 112. A user operating the communication device 110 may run the web application browser to access the AOE 140. In addition or alternatively, the user interfacing application portions of the AOE 140 may be installed on a user's computing device (e.g., communication device 110) to run locally when a network connection to network 130 is not available or when enhanced security measures are required for isolating the user's computing device from external influences.

The application platform system 100 also includes the automation server 120. The automation server 120 observes an enterprise process by recording user's keystroke actions with an application running on a communication device used during the enterprise process. The automation server 120 then analyzes the recorded user's keystroke actions to determine processes or sub-processes that are automatable, processes or sub-processes that are potentially automatable, and processes or sub-processes that are not automatable. The automation server 120 provides information to the AOE 140 in the form of automation reports, interaction reports, and entitlement studies. An automation report describes processes or sub-processes detected from the enterprise process that the automation server 120 determines to be automatable. For example, the automation report may be in the format of an output from an automated identification diagnostic tool (AIDT) described in Indian Patent Application No. 201641030353, filed Sep. 6, 2016, the entirety of which is hereby incorporated by reference herein. An interaction report describes keystroke actions recorded by the automation server 120 during the enterprise process. An entitlement study combines the automation report with the interaction report to provide time and motion dimensional values to the automation report.

Figure 3:
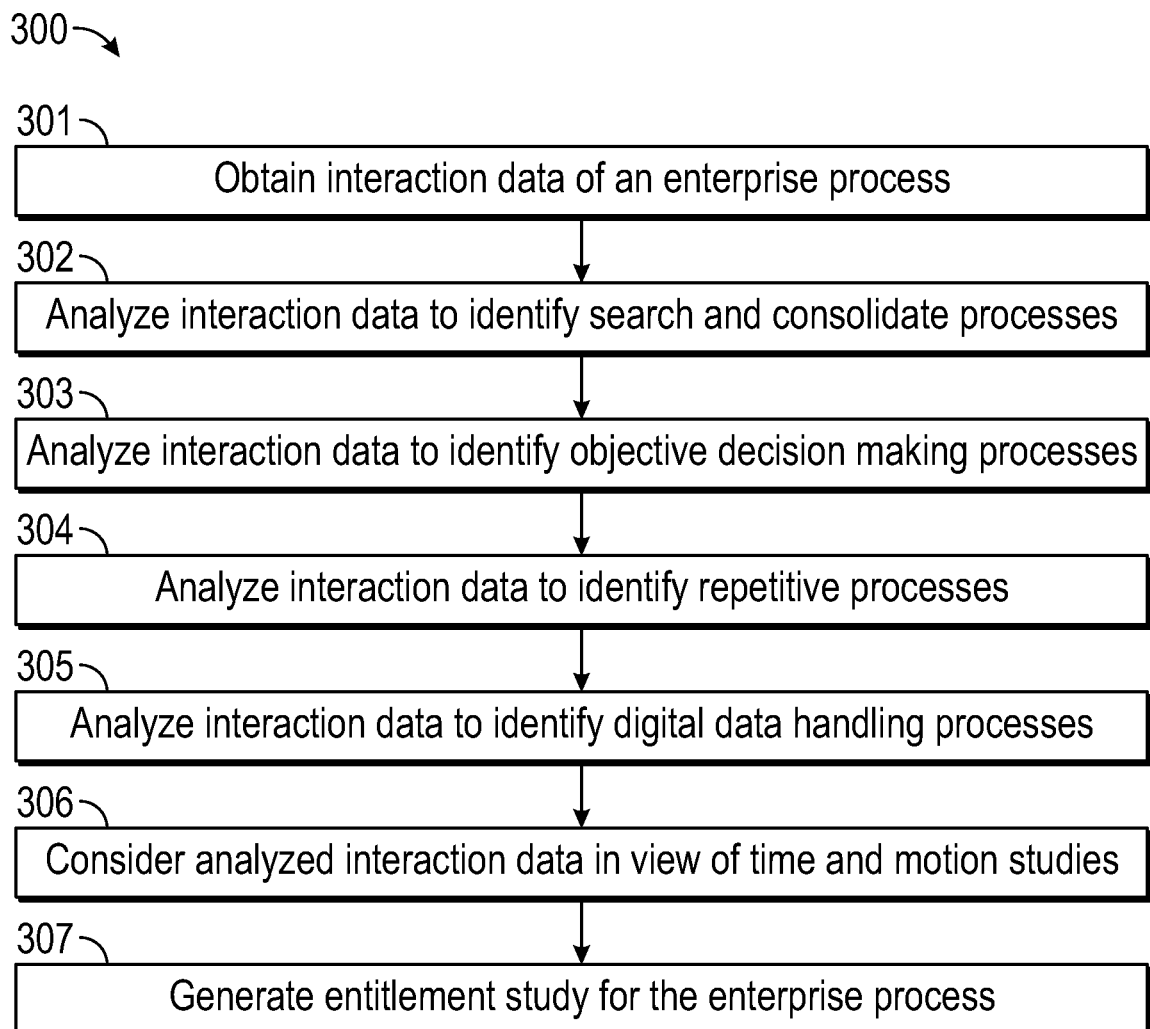
FIG. 3 illustrates an exemplary flow diagram describing a process for generating an entitlement study.

FIG. 3 shows a flow diagram 300 of logic describing an exemplary operation for generating an entitlement study corresponding to an observed enterprise process. The automation server 120 shown in FIG. 1 may be responsible for implementing the processes included in the flow diagram 300.

The automation server 120 initially obtains interaction data of the enterprise process (301). The interaction data may be in the form of captured screenshot images of a user interacting with an application running on a communication device (e.g., communication device 110) as part of the enterprise process. The interaction data may further include keystroke actions describing the user's keystrokes as the user interacts with the application during the enterprise process. The application may be a known application such as MS Excel or MS Word. The application may also be a specialized application developed for the enterprise process. The interaction data may have been captured directly by the automation server 120, or alternatively, the interaction data may have been received from the communication device 110 on which the application was running.

After obtaining the interaction data, the automation server 120 applies the CORD principles to identify sub-processes from the enterprise process that are automatable. So the automation server 120 analyzes the interaction data to identify search and consolidate processes (302). The automation server 120 analyzes the interaction data to identify objective decision making processes (303). The automation server 120 analyzes the interaction data to identify repetitive processes (304). The automation server 120 analyzes the interaction data to identify digital data handling processes (305).

After analyzing the interaction data under the CORD principles, the automation server 120 considers the analyzed interaction data in view of time and motion studies deduced from the user's keystroke actions captured during the enterprise process (306). The time and motion studies captured the basis of time stamps and screen interactions by the users. The time and motion studies are then used by the automation server 120 to generate an entitlement study for the enterprise process that combines the interaction data analyzed under the CORD principles with the interaction data (307). From this, the entitlement study identifies automatable processes, non-automatable processes, and non-automatable processes that are potentially automatable if some changes are made to promote automation or changes in upstream and downstream systems and process that enable the automations.

Referencing back to FIG. 1, the application platform system 100 also includes a machine learning server 150, where the machine learning server 150 shown in FIG. 1 may be representative of one or more server computers. The machine learning server 150 applies a known machine learning algorithm or technique to generate a recommendation report that includes recommendations for changes to a task or process to make the task or process automatable by an automation engine. The machine learning server will continuously append it's inference database with actions performed by users and recommendation of Data, this intern is used in future if same scenario comes to predict and update the action required in node. The automation engine may be, for example, the Robot Process Automation (RPA) tool described in Indian Patent Application No. 201641030353, filed Sep. 6, 2016, the entirety of which is hereby incorporated by reference herein.

Figure 2:
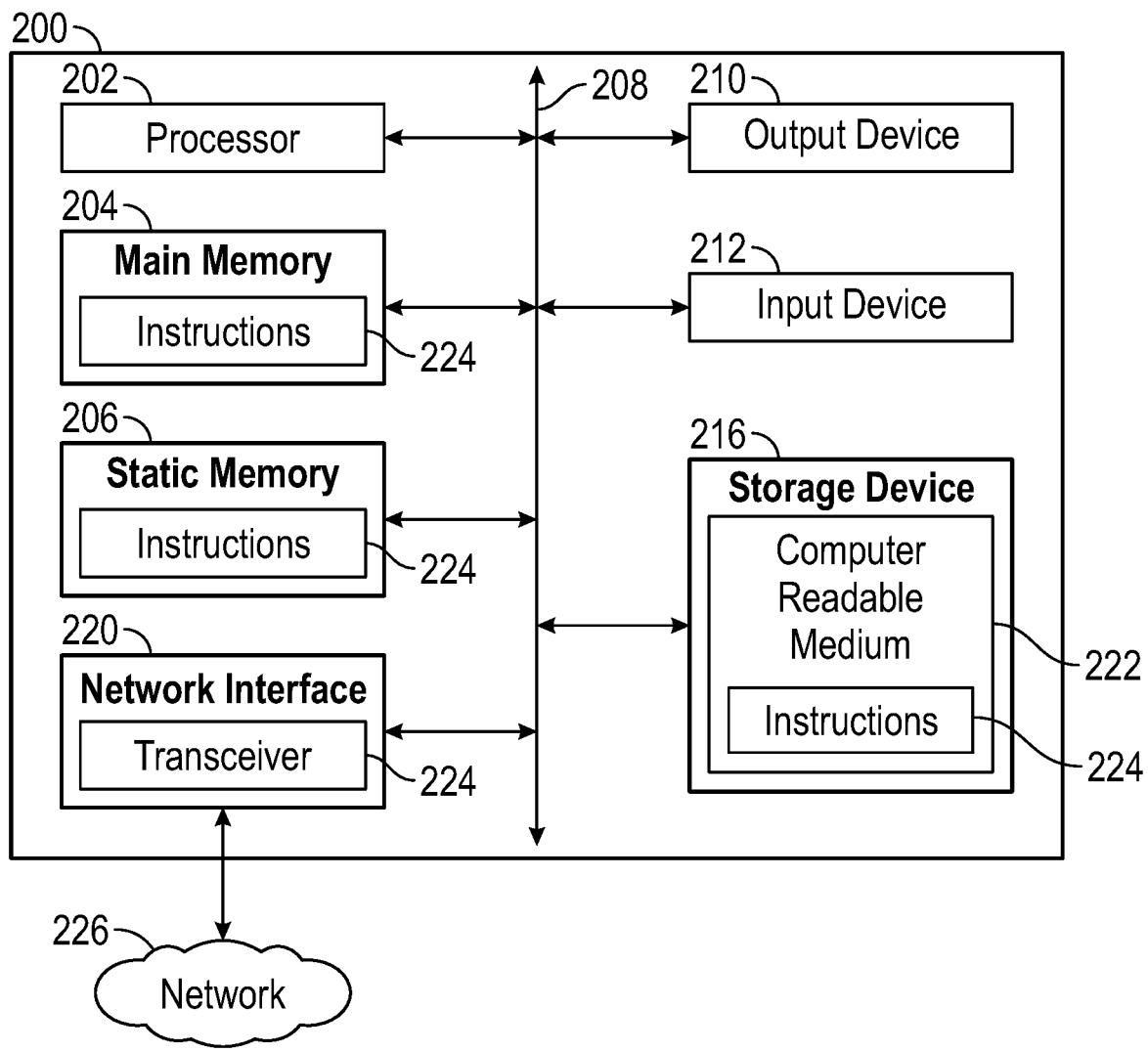
FIG. 2 illustrates a block diagram of an exemplary computer architecture for a device in the exemplary application platform system illustrated in FIG. 1.

Each of the communication device 110, the automation server 120, the machine learning server 150, and the AOE 140 may include one or more components of computer system 200 illustrated in FIG. 2. FIG. 2 illustrates exemplary computer architecture for the computer system 200. The computer system 200 includes a network interface 220 that allows communication with other computers via a network 226, where the network 226 may be represented by the network 130 in FIG. 1. The network 226 may be any suitable network and may support any appropriate protocol suitable for communication to the computer system 200. In an embodiment, the network 226 may support wireless communications. In another embodiment, the network 226 may support hard-wired communications, such as a telephone lines or cables. In another embodiment, the network 226 may support the Ethernet IEEE (Institute of Electrical and Electronics Engineers) 802.3x specification. In another embodiment, the network 226 may be the Internet and may support IP (Internet Protocol). In another embodiment, the network 226 may be a LAN or a WAN. In another embodiment, the network 226 may be a hotspot service provider network. In another embodiment, the network 226 may be an intranet. In another embodiment, the network 226 may be a GPRS (General Packet Radio Service) network. In another embodiment, the network 226 may be any appropriate cellular data network or cell-based radio network technology. In another embodiment, the network 226 may be an IEEE 802.11 wireless network. In still another embodiment, the network 226 may be any suitable network or combination of networks. Although one network 226 is shown in FIG. 2, the network 226 may be representative of any number of networks (of the same or different types) that may be utilized.

The computer system 200 may also include a processor 202, a main memory 204, a static memory 206, an output device 210 (e.g., a display or speaker), an input device 212, and a storage device 216, communicating via a bus 208.

The processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 202 executes instructions 224 stored on one or more of the main memory 204, the static memory 206, or the storage device 215. The processor 202 may also include portions of the computer system 200 that control the operation of the entire computer system 200. The processor 202 may also represent a controller that organizes data and program storage in memory and transfers data and other information between the various parts of the computer system 200.

The processor 202 is configured to receive input data and/or user commands through an input device 212. The input device 212 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to the computer system 200 and control operation of the computer system 200 and/or operation of the AOE 140. The input device 212 as illustrated in FIG. 2 may be representative of any number and type of input devices.

The processor 202 may also communicate with other computer systems via the network 226 to receive instructions 224, where the processor 202 may control the storage of such instructions 224 into any one or more of the main memory 204 (e.g., random access memory (RAM)), the static memory 206 (e.g., read only memory (ROM)), or the storage device 216. The processor 202 may then read and execute instructions 224 from any one or more of the main memory 204, the static memory 206, or the storage device 216. The instructions 224 may also be stored onto any one or more of the main memory 204, the static memory 206, or the storage device 216 through other sources. The instructions 224 may correspond to, for example, instructions that are executed to implement the operation of the AOE 140.

Although the computer system 200 is represented in FIG. 2 as including a single processor 202 and a single bus 208, the disclosed embodiments applies equally to computer systems that may have multiple processors and to computer systems that may have multiple busses with some or all performing different functions in different ways.

The storage device 216 represents one or more mechanisms for storing data. For example, the storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although the computer system 200 is drawn to contain the storage device 216, it may be distributed across other computer systems that are in communication with the computer system 200, such as a server in communication with the computer system 200.

The storage device 216 may include a controller (not shown) and a computer readable medium 222 having instructions 224 capable of being executed by the processor 202 to carry out features of the AOE 140. In another embodiment, some or all of the features attributed to the AOE 140 are carried out via hardware in lieu of a processor-based system. In one embodiment, the controller included in the storage device 216 is a web application browser, but in other embodiments the controller may be a database system, a file system, an electronic mail system, a media manager, an image manager, or may include any other functions capable of accessing data items. The storage device 216 may also contain additional software and data (not shown), for implementing described features.

The output device 210 is configured to present information to the user. For example, the output device 210 may be a display such as a liquid crystal display (LCD), a gas or plasma-based flat-panel display, or a traditional cathode-ray tube (CRT) display or other well-known type of display in the art of computer hardware. Accordingly in some embodiments, the output device 210 displays a user interface. In other embodiments, the output device 210 may be a speaker configured to output audible information to the user. In still other embodiments, any combination of output devices may be represented by the output device 210.

The network interface 220 provides the computer system 200 with connectivity to the network 226 through any compatible communications protocol. The network interface 220 sends and/or receives data from the network 226 via a wireless or wired transceiver 214. The transceiver 214 may be a cellular frequency, radio frequency (RF), infrared (IR) or any of a number of known wireless or wired transmission systems capable of communicating with the network 226 or other computer device having some or all of the features of the computer system 200. The bus 208 may represent one or more busses, e.g., USB, PCI, ISA (Industry Standard Architecture), X-Bus, EISA (Extended Industry Standard Architecture), or any other appropriate bus and/or bridge (also called a bus controller). The network interface 220 as illustrated in FIG. 2 may be representative of a single network interface card configured to communicate with one or more different data sources. For example, according to some embodiments the network interface 220 shown in FIG. 2 may be representative of the communication interface 147 or communication interface 112 shown in FIG. 1.

The computer system 200 may be implemented using any suitable hardware and/or software, such as a personal computer or other electronic computing device. In addition, the computer system 200 may also be a portable computer, laptop, tablet or notebook computer, PDA, pocket computer, appliance, telephone, server computer device, or mainframe computer.

Figure 4:
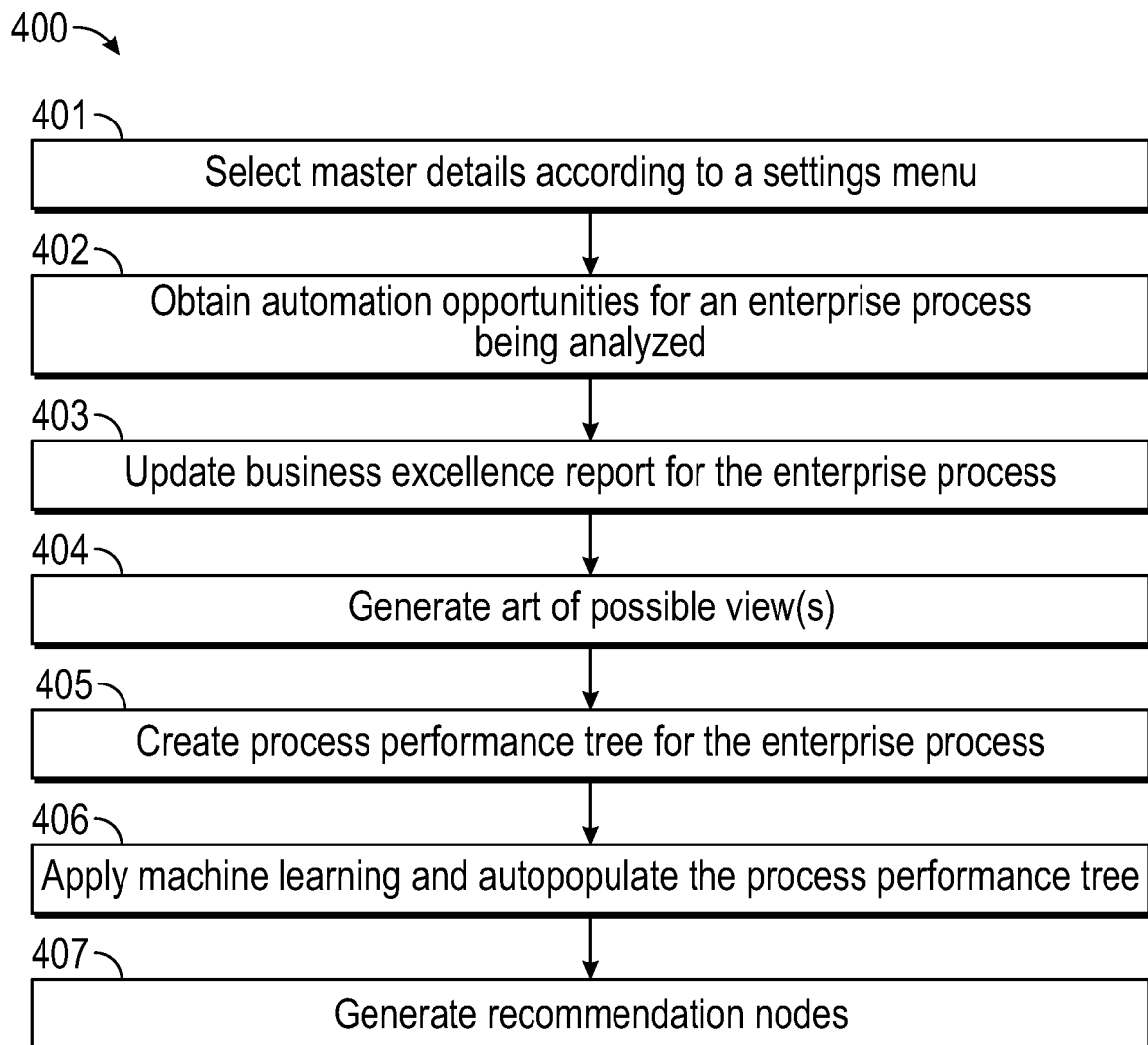
FIG. 4 illustrates an exemplary flow diagram describing a process implemented by the automation optimization engine.
Figure 6:
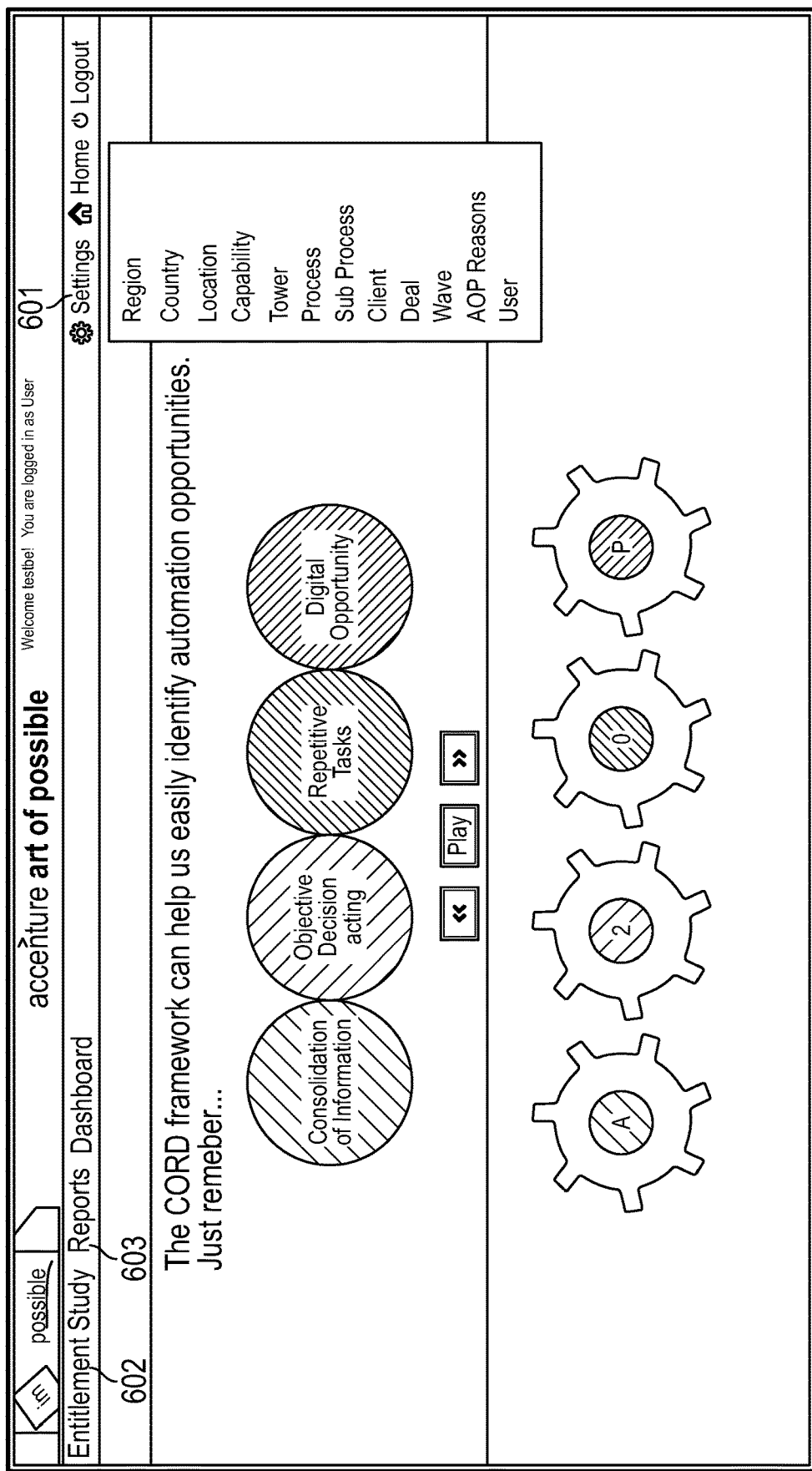
FIG. 6 illustrates an exemplary graphical user interface (GUI) generated by the automation optimization engine.

FIG. 4 illustrates a flow diagram 400 of logic describing an exemplary operation of generating recommendation nodes for an observed enterprise process. The AOE 140 shown in FIG. 1 may be responsible for implementing the processes included in the flow diagram 400. According to the embodiments relevant to the flow diagram 400, the AOE 140 is a web-based application accessible by an agent operating, for example, the communication device 110 shown in FIG. 1. For purposes of flow diagram 400, the web-based application running the AOE 140 will be referred to as the art of possible (AOP) application. The agent may operate the communication device 110 to transmit an access request to the AOE 140 through the network 130. Upon receipt of the access request, the AOE 140 may authorize the agent to access and operate the AOE 140 based on authorization credentials included in the access request that are authenticated by the AOE 140. After being granted access to the AOE 140, the agent may be presented with an AOP GUI 600 as shown in FIG. 6. Through the AOP GUI 600, the agent inputs information and requests for information, the AOE 140 receives the information, and the AOE 140 presents responsive information back to the agent.

For example, the agent may select master details under a settings option 601 presented on the AOP 600 (401). The master details that may be selected for editing include a geographical region option, a country option, a location option, a capability option, a tower option, a process option, a sub process option, a client option, a deal option, a wave option, an Art of Possible (AOP) reasons options, a user option, or any combination thereof. For example, the setting for a client in the Oil & Gas services industry operating from Bangalore and working on invoicing processes, may have the following setting as part of AOE optimization: geographical region option=APAC, a country option=India, a location option=Bangalore, a capability option=Finance & accounting, a tower option=Invoice payment, a process option=Invoice to Pay, a sub process option=Invoicing, a client option=Oil & Gas Client, a deal option=Project name, a wave option=Wave 1 (temporal field based on a time period the enterprise process has gone live in the current location), an Art of Possible (AOP) reasons options=Unstructured data input, and a user option=Business. The master details may be selected to setup an analysis for a specific enterprise process according to the specific attributes selected from the master details. For example, the enterprise process may be a finance and accounting process implemented in the Bangalore region of India, for client X, in deal Y.

The agent then obtains automation opportunities for the enterprise process being analyzed (402). The automation opportunities may include entitlement studies, automation reports, interaction reports, or any combination thereof. The automation opportunities may be uploading from the automation server 120 through an upload menu option on the AOP 600. For example, the AOP GUI 600 includes an entitlement study upload option 602 for uploading entitlement studies, and a reports upload option 603 for uploading the automation reports and interaction reports.

Once the automation opportunities are uploaded, the agent updates a business excellence report for the enterprise process (403). An exemplary business excellence report 705 is provided in the business excellence report GUI 700 shown in FIG. 12, where the business excellence report GUI 700 is also part of the AOP application. The business excellence report 705 describes known historical attributes of the enterprise process. The business excellence report 705 includes an identification of process subsets that comprise the enterprise process (i.e., distinguishable tasks or sub-processes within the enterprise process), a number of steps for each process subset, a description of a process flow for the respective process subset, an average monthly (or other time period) volume for the respective process subset, a measurable volume unit for the respective process subset, an average handle time (AHT) for the respective process subset, an identification of the respective process subset as being an input or output process, an identification of the respective process subset as being a logic based process, an identification of the respective process subset as being a judgment based process, an identification of the respective process subset as being an automatable process, an identification of the respective process subset belonging to one or more of the CORD principles for automation, or any combination thereof. The historical attributes populating the business excellence report 705 may have been accessed by the AOE 140 from the database 146.

The business excellence report 705 may be updated according to selections made through dropdown menus included in the options section 701 of the business excellence report GUI 700. The dropdown menus may be populated with options based on the access rights of the agent currently granted access to the web-based application. After making update changes through the dropdown menus included in the options section 701, the agent may update the business excellence report 705 by selecting the update option 702. The agent may also cancel update changes to the business excellence report 705 by selecting the cancel option 703.

An art of possible view is generated by the AOE 140 in response to the agent selecting the AOPV execution option 704 included in the business excellence report GUI 700 shown in FIG. 7 (404). The art of possible view includes the creation of process performance trees related to the enterprise process (405). The process performance tree is a specialized data format that includes data nodes representing specific attributes of the enterprise process. The AOE 140 applies machine learning to auto-populate each of the data nodes included in the process performance tree (406). The applied machine learning relies on a machine learning algorithm and AOE database(s) (e.g., database 146) to analyze all process performance trees to predict and pre-populate the process performance tress generated by the AOE 140, and to define non-automatable process scenarios process scenarios. The AOE database(s) is used to create AOE PoVs (Point of views) that will guide the users to arrive at correct AOE selections scenarios and some case enable further analysis and data collection to validate the AOE actions.

The machine learning may be implemented by the AOE 140 directly, or the AOE 140 may request the machine learning to be implemented by the machine learning server 150. Based on the obtained results of the machine learning, the AOE 140 then generates recommendation nodes that describe recommended changes to the enterprise process to bring non-automatable processes to an automatable state (407).

Figure 8:
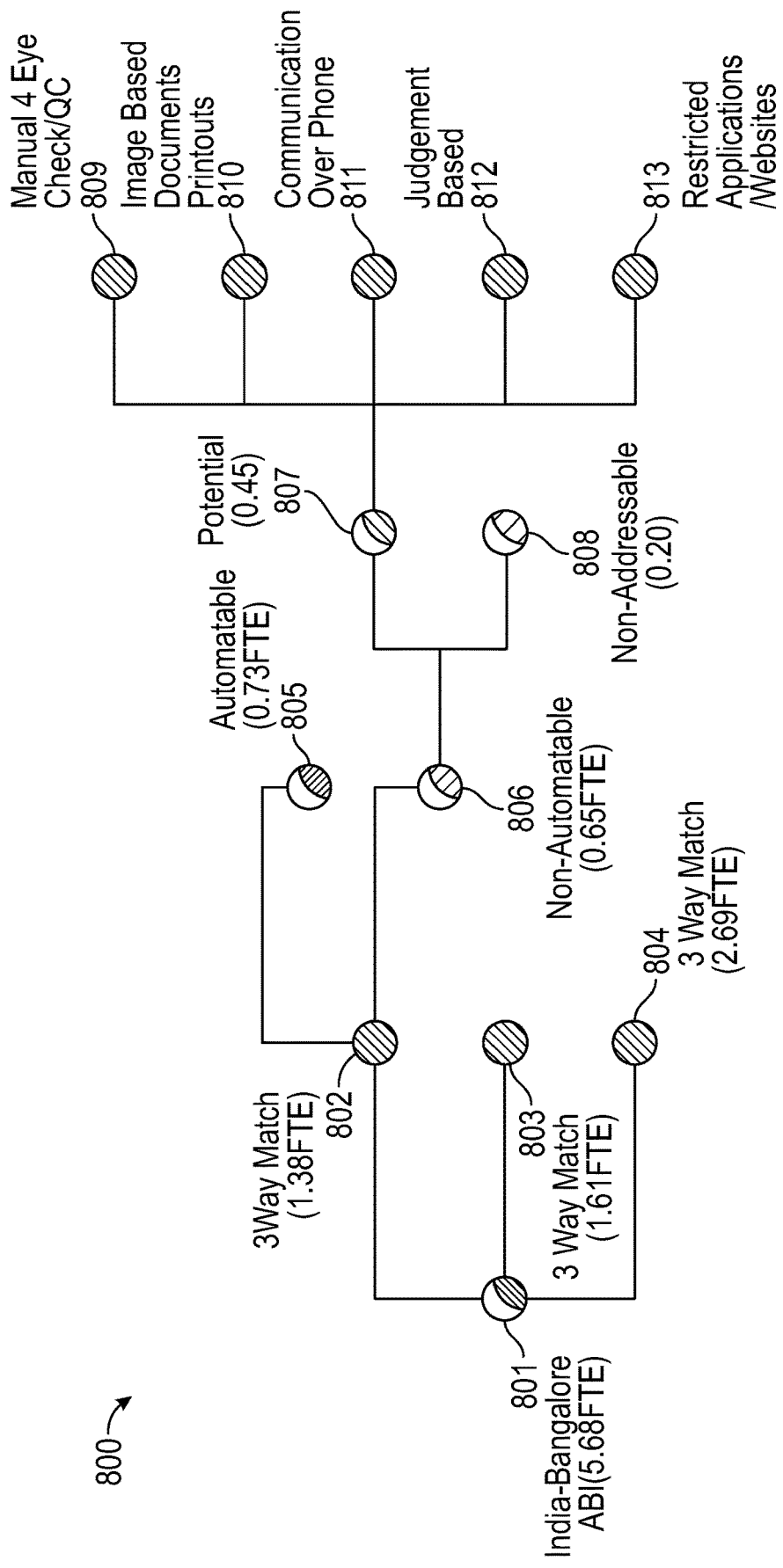
FIG. 8 illustrates an exemplary process performance tree generated by the automation optimization engine.

FIG. 8 show exemplary process performance tree 800. Process performance tree 800 begins with a root node 801 that identifies a region (Bangalore) and country (India) corresponding to the enterprise process being analyzed by the AOE 140. The root node 801 also identifies a total resource number for the enterprise process as a full time employee (FTE) number, 5.68 FTE. The 5.68 FTE value represents 5.68 full time employees are estimated to be required to accomplish the enterprise process before automation is implemented. From the root node 801, three separate child nodes branch out: a first task node 802, a second task node 803, and a third task node 804. The first task node 802 corresponds to a first 3-way match task having a 1.38 FTE value. The second task node 803 corresponds to a second 3-way match task having a 1.61 FTE value. The third task node 804 corresponds to a third 3-way match task having a 2.69 FTE value. Each of the 3-way tasks may correspond to a sub-process involving the matching of three documents (e.g., the invoice, the purchase order, and the receiving report).

The process performance tree 800 is shown to further expand on the first task node 802, although similar expansion analysis may be implemented on the remaining second task node 803 and the third task node 804. The first task node 802 is expanded to distinguish an automatable portion represented by an automatable node 805, and a non-automatable node 806. The automatable node 805 has a 0.73 FTE value, while the non-automatable node 806 has a 0.65 FTE value. By selecting on the automatable node 805, a list of sub-processes included in the first 3-way match task that are determined to be automatable may be displayed. The list of sub-processes included in the first 3-way match task that are determined to be automatable may be determined by the AOE 140 based on the received automation opportunities.

The non-automatable node 806 is further expanded to show a potentially automatable node 807, and a non-addressable node 808. The non-automatable node 806 has a 0.45 FTE value, and the non-addressable node has a 0.20 FTE value. The percentage of non-addressable processes (0.20 FTE) represented by the non-addressable node 808 may relate to processes that are required to be implemented by an agent (e.g., tasks that require a supervisor's approval), or other business rule restricting automation. From the set of potentially automatable processes represented by the potentially automatable node 807, the process performance tree 800 provides a list of recommendation nodes that identifies reasons why the potentially automatable processes are not yet automatable. For example, a first recommendation node 809 identifies a quality control process that currently involves a manual eye check by an agent (i.e., human). The first recommendation node 809 thus presents a recommendation to create a digital information checking process based Self input template to automate the manual eye check.

A second recommendation node 810 identifies a process that receives image based documents such as pdf printouts. Image based documents (e.g., pdf documents or picture images), while in a digital format, are difficult to extract information from. Often times optical character recognition (OCR) must be applied to the image based documents to extract alphanumeric information, where the OCR may not be reliably accurate. The second recommendation node 810 thus presents a recommendation to change the acceptance of image based documents, and rather require a process for accepting only alphanumeric information. This may be achieved by creating a personalized information gathering application that allows a user to input information directly into the information gathering application in the alphanumeric format. By receiving the information in a digital alphanumeric format, this process may be automatable.

A third recommendation node 811 identifies a process that receives information via communication over a phone. Information communicated over a phone is not automatable because it typically requires a human talking on either end of the phone line. The third recommendation node 811 thus presents a recommendation to change the mode of communication for this information to a digital based communication such as test message, email, or other direct electronic messaging service, thus making this process automatable.

A fourth recommendation node 812 identifies a process that gathers information based on an agent's judgment. Information that is gathered based on an agent's judgment requires the agent, and thus is not yet automatable. The fourth recommendation node 812 thus presents a recommendation to replace the agent judgment with a rules based model that may be implemented by a computing machine, thus making this process automatable.

A fifth recommendation node 813 identifies a process that gathers information from restricted applications or websites. Information that is gathered from restricted applications or websites often times requires an agent to manually input an access code or other authorizing information. The fifth recommendation node 813 thus presents a recommendation to make the access code/authorizing information available without the need for manual input by an agent, thus making this process automatable.

Figure 9:
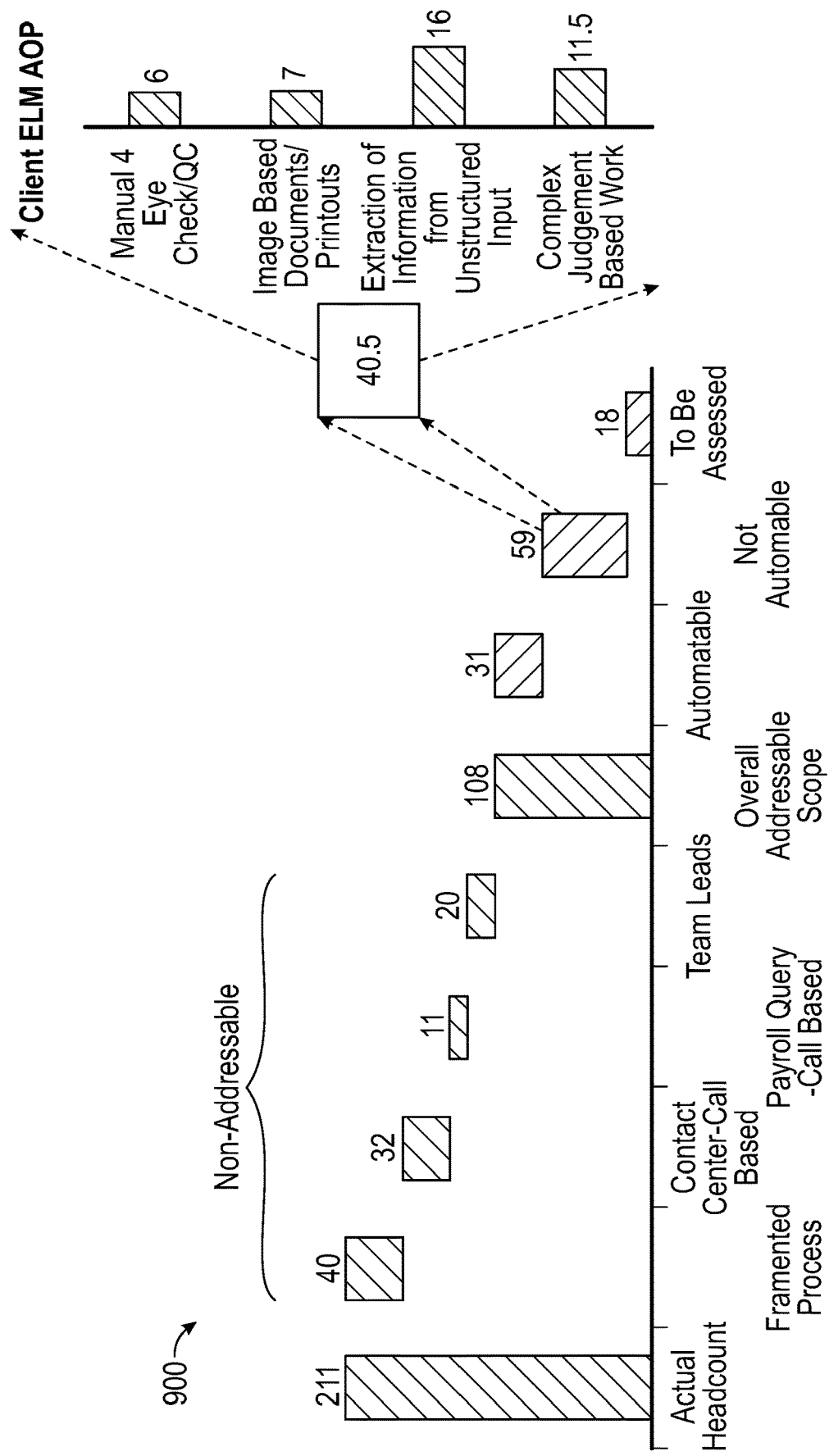
FIG. 9 illustrates an exemplary data visualization of an observed process analyzed by the automation optimization engine.

FIG. 9 shows an exemplary data visualization 900 describing the analysis implemented by the AOE 140 to generate a process performance tree. The values provided in the data visualization 900 is presented as a headcount of full time employees (FTE). The data visualization 900 is provided to present another perspective for how the AOE 140 analyzes the enterprise process to output the recommendations for automating potentially automatable processes.

The enterprise process being analyzed involves, for example, work from 211 FTEs according to the data visualization 900. Of the 211 FTEs, 103 FTEs are shown to be attributed to non-addressable processes. These non-addressable processes are not eligible for automation for a variety of reasons. For example, the data visualization 900 shows 40 FTEs are non-addressable due to being involved in fragmented processes, 32 FTEs are non-addressable due to being involved in contact center/call center based processes, 11 FTEs are non-addressable due to being involved in payroll query/call based processes, and 20 FTEs are non-addressable due to being team leads. Then, the remaining 108 FTEs are considered to be addressable for determining automatable versus non-automatable processes. Out of the addressable processes involving the 108 FTEs, 31 FTEs are associated with automatable processes, 59 FTEs are associated with non-automatable processes, and 18 FTEs are associated with processes to be assessed.

Within the scope of the non-automatable processes involving the 59 FTEs, the AOE 140 analyzes theses non-automatable processes to determine recommendations for changing the non-automatable processes to achieve further automation. Based on the analysis by the AOE 140, the AOE 140 determines that 40.5 FTEs out of the 59 FTEs can be further eliminated through automation if a set of recommended changes are made to the enterprise process. For example, a recommendation for addressing the issue of relying on manual eye checks during a quality control process is shown to eliminate an estimated 6 FTEs. A recommendation for addressing the issue of receiving image based documents is shown to eliminate an estimated 7 FTEs. A recommendation for addressing the issue of having to extract information from unstructured inputs is shown to eliminate an estimated 16 FTEs. A recommendation for addressing the issue of relying on complex judgment based work is shown to eliminate an estimated 11.5 FTEs. So by implementing each of the recommendations presented by the AOE 140, the same enterprise process may achieve further automation that is estimated to result in an savings of 40.5 FTEs.

Figure 5:
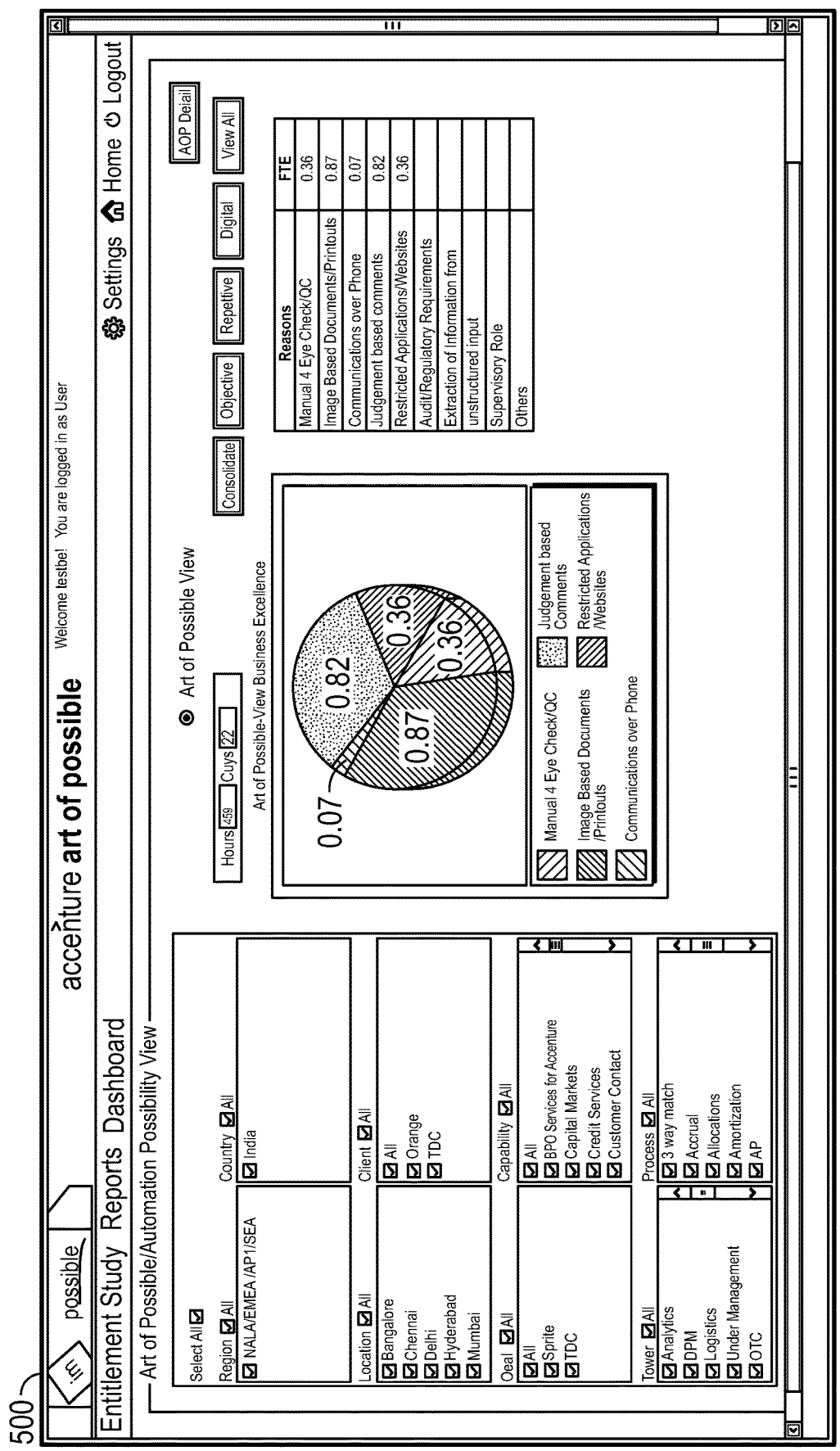
FIG. 5 illustrates an exemplary graphical user interface (GUI) view generated by the automation optimization engine.

Referring back to flow diagram 400, FIG. 5 shows an alternative art of possible view 500 that may be created by the AOE 140 based on selecting the AOPV execution option 704 from the business excellence report GUI 700 shown in FIG. 7 (404).

Figure 10:
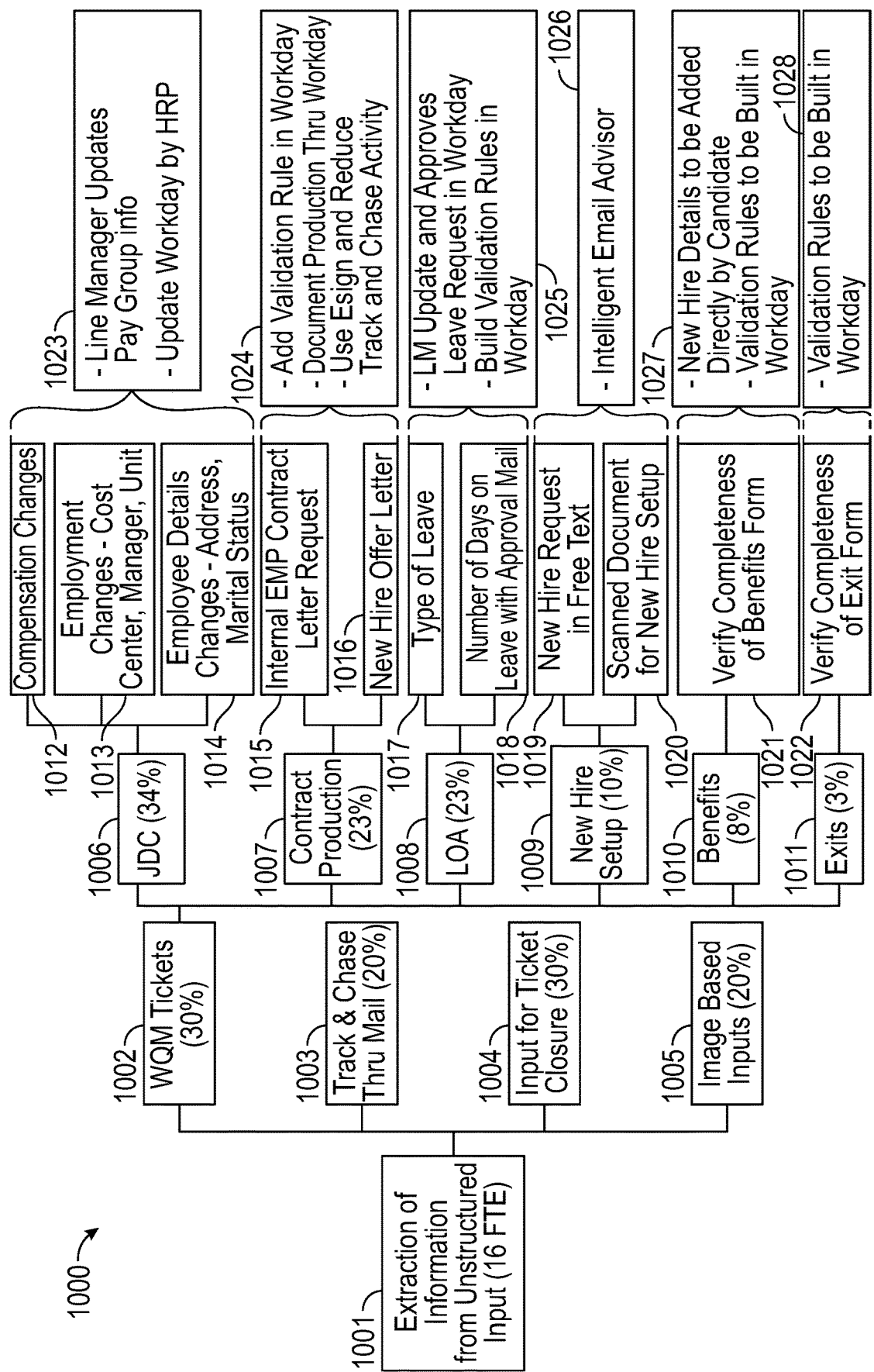
FIG. 10 illustrates a detailed process performance tree including recommendation nodes generated by the automation optimization engine.

FIG. 10 shows another exemplary process performance tree 1000 in an alternative format from the process performance tree 800. The process performance tree 1000 includes a root node 1001 describing a non-automatable issue preventing an enterprise process from becoming automated. In this embodiment, a first level of the process performance tree 1000 includes the root node 1001. The root node 1001 describes an extraction of information from unstructured inputs requires 16 FTEs, and is preventing automation of the enterprise process.

In a second level of the process performance tree 1000, included are sub-processes that are determined by the AOE 140 to be non-automatable due to the issue described in the root node 1001. This includes a second node 1002 describing a Work flow Queue Management (WQM) tickets sub-process, where the WQM tickets sub-process accounts for 30% of the 16 FTEs associated with the root node 1001 non-automation issue. This also includes a third node 1003 describing a track and chase thru mail (paper mail) sub-process, where the track and chase thru mail (paper mail) sub-process accounts for 20% of the 16 FTEs associated with the root node 1001 non-automation issue. This also includes a fourth node 1004 describing an input for ticket closure sub-process, where the input for ticket closure sub-process accounts for 30% of the 16 FTEs associated with the root node 1001 non-automation issue. This also includes a fifth node 1005 describing an image based inputs sub-process, where the image based inputs sub-process accounts for 20% of the 16 FTEs associated with the root node 1001 non-automation issue.

From the various sub-processes analyzed by the AOE 140 in the second level, a third level of the process performance tree 1000 includes additional sub-processes that comprise the WQM tickets process described by the second node 1002. This includes a sixth node 1006 describing a Job Data Change (JDC) sub-process. This also includes a seventh node 1007 describing a contract production sub-process. This also includes an eighth node 1008 describing a leave of absence (LOA) sub-process. This also includes a ninth node 1009 describing a new hire setup sub-process. This also includes a tenth node 1010 describing a benefits sub-process. This also includes an eleventh node 1011 describing an eleventh sub-process.

In a third level of the process performance tree 1000, the sixth node 1006 describing the JDC sub-process is further expanded to include nodes that describe deeper sub-processes associated with the JDC sub-process: a twelfth node 1012 describing a sub-process for handling compensation changes for an employee, a thirteenth node 1013 describing a sub-process for handling employment changes for an employee related to the employee's role, and a fourteenth node 1014 describing a sub-process for handling changes to an employee's details such as home address or marital status. For these group of sub-processes, a fourth level of the process performance tree 1000 presents a recommendation node 1023 generated by the AOE 140. The recommendation node 1023 presents a recommendation for having line managers update pay group info, and to update the workday by human resources and payroll (HRP). By following the recommendation described in the recommendation node 1023, the AOE 140 predicts automation may be achieved for further optimizing the workforce.

In the third level of the process performance tree 1000, the seventh node 1007 describing the contract production sub-process is further expanded to include nodes that describe deeper sub-processes associated with the contract production sub-process: a fifteenth node 1015 describing a sub-process for handling internal employment (EMP) contract letter requests, and a sixteenth node 1016 describing a sub-process for generating and mailing out new hire offer letters. For these group of sub-processes, the fourth level of the process performance tree 1000 presents a recommendation node 1024 generated by the AOE 140. The recommendation node 1024 presents a recommendation for adding a validation rule in the workday, implementing document production thru the workday, and using digital E-sign to reduce track and chase activities. By following the recommendation described in the recommendation node 1024, the AOE 140 predicts automation may be achieved for further optimizing the workforce.

In the third level of the process performance tree 1000, the eighth node 1008 describing the LOA sub-process is further expanded to include nodes that describe deeper sub-processes associated with the LOA sub-process: a seventeenth node 1017 describing a sub-process for handling different types of leave available to an employee, and an eighteenth node 1018 describing a sub-process for calculating a number of leave days an employee has available and approving employee leave through mail. For these group of sub-processes, the fourth level of the process performance tree 1000 presents a recommendation node 1025 generated by the AOE 140. The recommendation node 1025 presents a recommendation for having a line manager (LM) update and approve leave requests during the workday, and building validation rules in the workday. By following the recommendation described in the recommendation node 1025, the AOE 140 predicts automation may be achieved for further optimizing the workforce.

In the third level of the process performance tree 1000, the ninth node 1009 describing the new hire setup sub-process is further expanded to include nodes that describe deeper sub-processes associated with the new hire setup sub-process: a nineteenth node 1019 describing a sub-process for handling new hire requests in free text paper format, and a twentieth node 1020 describing a sub-process for scanning paper documents for new hire setup. For these group of sub-processes, the fourth level of the process performance tree 1000 presents a recommendation node 1026 generated by the AOE 140. The recommendation node 1026 presents a recommendation for creating an intelligent email advisor to receive the new hire setup information in a digital format. By following the recommendation described in the recommendation node 1026, the AOE 140 predicts automation may be achieved for further optimizing the workforce.

In the third level of the process performance tree 1000, the tenth node 1010 describing the benefits sub-process is further expanded to include nodes that describe deeper sub-processes associated with the benefits sub-process: a twenty first node 1021 describing a sub-process for verifying a completeness of a paper format benefits form. For this sub-process, the fourth level of the process performance tree 1000 presents a recommendation node 1027 generated by the AOE 140. The recommendation node 1027 presents a recommendation for new hire details to be added directly by the candidate in a digital format, and implementing validation rules to be built into the workday. By following the recommendation described in the recommendation node 1027, the AOE 140 predicts automation may be achieved for further optimizing the workforce.

In the third level of the process performance tree 1000, the eleventh node 1011 describing the exits sub-process is further expanded to include nodes that describe deeper sub-processes associated with the exits sub-process: a twenty second node 1022 describing a sub-process for verifying a completeness of a paper format exits form for when an employee is leaving a company. For this sub-process, the fourth level of the process performance tree 1000 presents a recommendation node 1028 generated by the AOE 140. The recommendation node 1028 presents a recommendation for implementing validation rules to be built into the workday. By following the recommendation described in the recommendation node 1028, the AOE 140 predicts automation may be achieved for further optimizing the workforce.

The fourth level of the process performance tree 1000 is shown to describe manual processes that are not yet automatable in their current state. The AOE 140 is able to apply the machine learning to then generate the recommendations for automating such non-automatable processes. The recommendations are generated to be included in the recommendation nodes 1023-1028.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:

1. A computer system, comprising:
   a communication interface configured to communicate with a machine learning server and an automation server;
   a processor configured to communicate with the communication interface, the processor further configured to:
   receive, through the communication interface, an automation request including an observed process;
   receive, through the communication interface, an automation report for the observed process from the automation server;
   update a business excellence report for the observed process;
   provide, through the communication interface, the business excellence report to the machine learning server;
   receive, through the communication interface, a process performance tree for the observed process from the machine learning server, the process performance tree including a recommendation node for the observed process generated by the machine learning server according to a machine learning technique; and
   generate an art of possible view based on the process performance tree, the art of possible view including automatable tasks of the observed process, non-automatable tasks of the observed process, and the recommendation node including steps for implementing in the observed process to convert the non-automatable tasks into automatable tasks.

2. The computer system of claim 1, wherein the process performance tree includes:
   a location node including a location of the observed process;
   a task node including an enterprise task included in the observed process;
   an automation indicator node including a portion of the enterprise task that is automatable;
   a non-automation indicator including a portion of the enterprise task that is non-automatable; or
   any combination thereof.

3. The computer system of claim 1, wherein each corresponding node in the process performance tree includes a full time employee (FTE) estimation representing a number of full time employees related to the corresponding node.

4. The computer system of claim 1, wherein the processor is further configured to:
   generate the art of possible view based on the process performance tree; and
   control a display screen in communication with the computer system to display the art of possible view on a graphical user interface (GUI) displayed on the display screen.

5. The computer system of claim 1, wherein the automation report is an entitlement study including automatable tasks determined from the observable process and interaction data identifying keystroke observations recorded for the observed process.

6. The computer system of claim 5, wherein the automatable tasks are determined based on keystroke observations related to consolidated user activities, objective decision making, repeatable actions, digital data, or any combination thereof.

7. The computer system of claim 1, wherein the automation report comprises interaction data representing the observed process, the interaction data comprising a captured screenshot image representing user interaction with an application, user keystroke actions, or both.

8. A method comprising:
   receiving, by a processor, an automation request including an observed process;
   receiving, by the processor, an automation report for the observed process from an automation server;
   updating, by the processor, a business excellence report for the observed process;
   providing, by the processor, the business excellence report to a machine learning server;
   receiving, by the processor, a process performance tree for the observed process from the machine learning server, the process performance tree including a recommendation node for the observed process generated by the machine learning server according to a machine learning technique; and
   generating, by the processor, an art of possible view based on the process performance tree, the art of possible view including automatable tasks of the observed process, non-automatable tasks of the observed process, and the recommendation node including steps for implementing in the observed process to convert the non-automatable tasks into automatable tasks.

9. The method of claim 8, wherein the process performance tree includes a location node including a location of the observed process, a task node including an enterprise task included in the observed process, an automation indicator node including a portion of the enterprise task that is automatable, a non-automation indicator including a portion of the enterprise task that is non-automatable, or any combination thereof; and
   wherein each corresponding node in the process performance tree includes a full time employee (FTE) estimation representing a number of full time employees related to the corresponding node.

10. The method of claim 8, further comprising:
    generating, by the processor, the art of possible view based on the process performance tree; and
    controlling a display screen in communication with the processor to display the art of possible view on a graphical user interface (GUI) displayed on the display screen.

11. The method of claim 8, wherein the automation report is an entitlement study including automatable tasks determined from the observable process and interaction data identifying keystroke observations recorded for the observed process.

12. The method of claim 11, wherein the automatable tasks are determined based on keystroke observations related to consolidated user activities, objective decision making, repeatable actions, digital data, or any combination thereof.

13. The method of claim 8, wherein receiving, by the processor, the automation request including an observed process comprises receiving a request to observe a non-automated enterprise work flow process.

14. An automation optimization engine comprising:
a communication interface circuitry configured to communicate with a machine learning server computer and an automation server computer;
a web server computer including a presentation layer and a business layer; and
a database server computer including functions and a database;
wherein the web server computer is configured to:
receive, through the communication interface circuitry, an automation request including an observed process;
receive, through the communication interface circuitry, an automation report for the observed process;
update, by the business layer, a business excellence report for the observed process;
display, by the presentation layer, the business excellence report on a display screen in communication with the web server computer;
generate, by the business layer implementing a machine learning technique, a process performance tree for the observed process based on the business excellence report, the process performance tree including a recommendation node for the observed process; and
generate, by the presentation layer, an art of possible view based on the process performance tree, the art of possible view including automatable tasks of the observed process, non-automatable tasks of the observed process, and the recommendation node including steps for implementing in the observed process to convert the non-automatable tasks into automatable tasks.

15. The automation optimization engine of claim 14, wherein the process performance tree includes a location node including a location of the observed process, a task node including an enterprise task included in the observed process, an automation indicator node including a portion of the enterprise task that is automatable, a non-automation indicator including a portion of the enterprise task that is non-automatable, or any combination thereof; and
wherein each corresponding node in the process performance tree includes a full time employee (FTE) estimation representing a number of full time employees related to the corresponding node.

16. The automation optimization engine of claim 14, wherein the presentation layer provides a graphical user interface (GUI) for requesting the automation request; and
the business layer includes business process information, business rule information, and a data access layer that are referenced by the machine learning technique.

17. The automation optimization engine of claim 14, wherein the web server computer is further configured to:
generate, by the presentation layer, the art of possible view based on the process performance tree; and
control, by the presentation layer, a display screen in communication with the automation optimization engine to display the art of possible view on a graphical user interface (GUI) displayed on the display screen.

18. The automation optimization engine of claim 14, wherein the automation report is an entitlement study including automatable tasks determined from the observable process and interaction data identifying keystroke observations recorded for the observed process.

19. The automation optimization engine of claim 18, wherein the automatable tasks are determined based on keystroke observations related to consolidated user activities, objective decision making, repeatable actions, digital data, or any combination thereof.

20. The automation optimization engine of claim 14, wherein the business layer is configured to create a roadmap identifying non-automatable sub-processes within the observed process and providing tailored recommendations describing specific changes that will bring the non-automatable sub-processes to an automatable state.

* * * * *